(12) United States Patent
Mizobuchi et al.

(10) Patent No.: US 9,632,260 B2
(45) Date of Patent: Apr. 25, 2017

(54) TRANSMITTER AND RECEIVER INTEGRATED OPTICAL SUB-ASSEMBLY AND OPTICAL MODULE

(71) Applicant: Hitachi Metals, Ltd., Tokyo (JP)

(72) Inventors: Kenji Mizobuchi, Hitachi (JP); Ryuta Takahashi, Hitachi (JP); Kenichi Tamura, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/078,952

(22) Filed: Mar. 23, 2016

(65) Prior Publication Data

US 2016/0294477 A1    Oct. 6, 2016

(30) Foreign Application Priority Data

Apr. 2, 2015   (JP) .................. 2015-076139

(51) Int. Cl.
*H04B 10/00*   (2013.01)
*G02B 6/42*   (2006.01)

(52) U.S. Cl.
CPC ..................... *G02B 6/42* (2013.01)

(58) Field of Classification Search
CPC ........ H04B 10/40; H04B 10/801; H04B 1/38; H04J 14/02; G02B 6/4246; G02B 6/42; G02B 6/4279; G02B 6/4274; G02B 6/428; G02B 6/4281; G02B 6/4284; G02B 6/4295
USPC ......................... 398/135–139, 164
See application file for complete search history.

(56) References Cited

U.S. PATENT DOCUMENTS

| 7,013,088 | B1 * | 3/2006 | Jiang | G02B 6/4204 385/88 |
| 7,306,377 | B2 * | 12/2007 | Ellison | G02B 6/4246 385/14 |
| 7,416,353 | B2 * | 8/2008 | Yoshikawa | G02B 6/4201 385/14 |
| 7,798,820 | B2 * | 9/2010 | Hong | H05K 1/117 385/92 |
| 7,933,521 | B2 | 4/2011 | Wen et al. | |

(Continued)

FOREIGN PATENT DOCUMENTS

| JP | 2013-145356 A | 7/2013 |
| JP | 2014-137475 A | 7/2014 |

*Primary Examiner* — Hibret Woldekidan
(74) *Attorney, Agent, or Firm* — McGinn IP Law Group, PLLC

(57) ABSTRACT

A transmitter and receiver integrated optical sub-assembly includes a housing including a side wall structure and a bottom wall, a transmitter-side optical receptacle and a receiver-side optical receptacle attached to the side wall structure, a second circuit board inserted into the housing, laser diodes and photo diodes arranged on the bottom wall, a transmitter-side optical system that is disposed on the bottom wall and combines optical signals from the laser diodes, a receiver-side optical system that is disposed on the bottom wall and splits an optical signal from the receiver-side optical receptacle, a driver integrated circuit, and an amplifying integrated circuit. In the transmitter and receiver integrated optical sub-assembly, electrodes formed at the other end portion of the second circuit board are connected to the driver integrated circuit and the amplifying integrated circuit.

6 Claims, 5 Drawing Sheets

(56) References Cited

U.S. PATENT DOCUMENTS

| | | | | |
|---|---|---|---|---|
| 8,967,884 B2* | 3/2015 | Kondou | ............... | G02B 6/4245 385/92 |
| 8,985,871 B2* | 3/2015 | Mizobuchi | ............... | G02B 6/43 385/14 |
| 9,042,735 B2* | 5/2015 | Shah | ............... | H04B 10/40 385/92 |
| 9,217,835 B2* | 12/2015 | Ishiyama | ............... | G02B 6/428 |
| 9,325,420 B2* | 4/2016 | Lai | ............... | H04B 10/50 |
| 9,363,021 B2* | 6/2016 | Fujimura | ............... | G01J 1/44 |
| 2001/0030789 A1* | 10/2001 | Jiang | ............... | G02B 6/4201 398/164 |
| 2009/0004915 A1* | 1/2009 | Ice | ............... | H01R 13/648 439/607.01 |
| 2009/0034982 A1* | 2/2009 | Deng | ............... | G02B 6/12004 398/139 |
| 2010/0098374 A1* | 4/2010 | Althaus | ............... | G02B 6/4214 385/14 |
| 2011/0031385 A1* | 2/2011 | Ishigami | ............... | G02B 6/4214 250/239 |
| 2011/0222817 A1* | 9/2011 | Smaglinski | ............... | G02B 6/4215 385/17 |
| 2012/0237223 A1* | 9/2012 | Matsui | ............... | G02B 6/4292 398/82 |
| 2012/0301152 A1* | 11/2012 | Edwards | ............... | G02B 6/4201 398/135 |
| 2013/0121650 A1* | 5/2013 | Mizobuchi | ............... | G02B 6/43 385/89 |
| 2013/0148966 A1 | 6/2013 | Kurokawa et al. | | |
| 2014/0140667 A1* | 5/2014 | Wu | ............... | G02B 6/428 385/92 |
| 2015/0098675 A1* | 4/2015 | Ishiyama | ............... | G02B 6/4214 385/14 |
| 2015/0338588 A1* | 11/2015 | Matsui | ............... | G02B 6/4261 385/92 |
| 2015/0346442 A1* | 12/2015 | Tamura | ............... | G02B 6/4215 385/24 |
| 2016/0291271 A1* | 10/2016 | Mizobuchi | ............... | G02B 6/4279 |

* cited by examiner

TRANSMITTER AND RECEIVER INTEGRATED OPTICAL SUB-ASSEMBLY AND OPTICAL MODULE

The present application is based on Japanese patent application No. 2015-076139 filed on Apr. 2, 2015, the entire contents of which are incorporated herein by reference.

BACKGROUND OF THE INVENTION

1. Field of the Invention

The present invention relates to a transmitter and receiver integrated optical sub-assembly and an optical module.

2. Description of the Related Art

The wavelength division multiplexing (WDM) is known as a technology with which the transmission capacity per optical fiber is increased. With the WDM, optical signals having different wavelengths are multiplexed so as to increase the transmission capacity.

As related-art optical sub-assemblies supporting the WDM, a transmitter optical sub-assembly (TOSA) and a receiver optical sub-assembly (ROSA) are known. The TOSA includes a plurality of light emitting elements that emit beams of light at different light emission wavelengths and combines the beams emitted from the light emitting elements into a beam so as to output the combined beam. The ROSA splits an input optical signal (an optical signal obtained by multiplexing optical signals of different wavelengths) into optical signals of the different wavelengths which are each received by a corresponding one of a plurality of light receiving elements (see, for example, Japanese Unexamined Patent Application Publication Nos. 2013-145356 and 2014-137475). U.S. Pat. No. 7,933,521 is also an example of related art.

The related-art optical modules can perform transmission and reception using the TOSA and the ROSA housed in a common casing. Typically, the TOSA and the ROSA are included in respective separate optical sub-assemblies, and accordingly, include their respective housings.

SUMMARY OF THE INVENTION

Recently, an optical transmission system has been developed which supports a transmission speed of 100 Gb/s (gigabits per second) by multiplexing four optical signals of different wavelengths each transmitted at an information transmission speed of 25 Gb/s.

In order to realize an optical module supporting such high-speed transmission of 100 Gb/s, there is the demand for an optical sub-assembly with which degradation of high-speed signals is suppressed and the size of which is small so as to be able to be housed in a casing having a size specified in, for example, C Form Factor Pluggable (100 G) (CFP), which is one of specifications of Multi-Source Agreements (MSA).

In the above-described related-art optical modules that include the TOSA and the ROSA housed in a common casing, the TOSA and the ROSA include their respective housings. This increases the entire size of the optical sub-assembly. Thus, there still is a room for improvement.

Accordingly, an object of the present invention is to provide a transmitter and receiver integrated optical sub-assembly and an optical module which are suitable for high-speed transmission and the sizes of which are reduced.

In order to address the above-described task, a transmitter and receiver integrated optical sub-assembly provided according to a first aspect of the present invention includes a housing, a transmitter-side optical receptacle, a receiver-side optical receptacle, a circuit board, a plurality of light emitting elements, a plurality of light receiving elements, a transmitter-side optical system, a receiver-side optical system, a driver integrated circuit, and an amplifying integrated circuit. The housing includes a box-shaped side wall structure having openings at its top and bottom in a height direction and a bottom wall closing one of the openings at the bottom of the side wall structure. The transmitter-side optical receptacle and the receiver-side optical receptacle are respectively attached to one and another of two through holes formed on one side of the side wall structure in a length direction which is perpendicular to the height direction. The circuit board has one end portion inserted into the housing through a through hole for a board formed on another side of the side wall structure in the length direction and another end portion disposed outside the housing. The plurality of light emitting elements is disposed on the bottom wall so as to be arranged in a row in a width direction which is perpendicular to the height direction and perpendicular to the length direction, and the plurality of light receiving elements is disposed on the bottom wall so as to be arranged in a row in the width direction. The transmitter-side optical system is disposed in a region of the bottom wall between the transmitter-side optical receptacle and the plurality of light emitting elements and combines optical signals incident thereupon from the plurality of light emitting elements into a signal so as to output the combined signal to the transmitter-side optical receptacle. The receiver-side optical system is disposed in a region of the bottom wall between the receiver-side optical receptacle and the plurality of light receiving elements and splits an optical signal incident thereupon from the receiver-side optical receptacle into signals so as to output the split signals to the plurality of light receiving elements. The driver integrated circuit is disposed between the plurality of light emitting elements and the other side of the side wall structure in the length direction and drives the plurality of light emitting elements. The amplifying integrated circuit is disposed between the plurality of light receiving elements and the other side of the side wall structure in the length direction and amplifies electric signals from the plurality of light receiving elements. In the transmitter and receiver integrated optical sub-assembly, the circuit board includes a plurality of electrodes arranged in the width direction at the other end portion of the circuit board. In the transmitter and receiver integrated optical sub-assembly, the plurality of electrodes are electrically connected to the driver integrated circuit and the amplifying integrated circuit through a wiring pattern formed on the circuit board.

In order to address the above-described task, an optical module provided according to a second aspect of the present invention includes the above-described transmitter and receiver integrated optical sub-assembly and a casing that houses the transmitter and receiver integrated optical sub-assembly.

According to the present invention, there can be provided a transmitter and receiver integrated optical sub-assembly and an optical module which are suitable for high-speed transmission and the sizes of which are reduced.

BRIEF DESCRIPTION OF THE DRAWINGS

FIG. 2A is a perspective view of the transmitter and receiver integrated optical sub-assembly, and FIG. 2B is a plan view of the transmitter and receiver integrated optical sub-assembly.

DESCRIPTION OF THE PREFERRED EMBODIMENTS

Embodiment

An embodiment of the present invention will be described below with reference to the accompanying drawings.

Figure 1A:
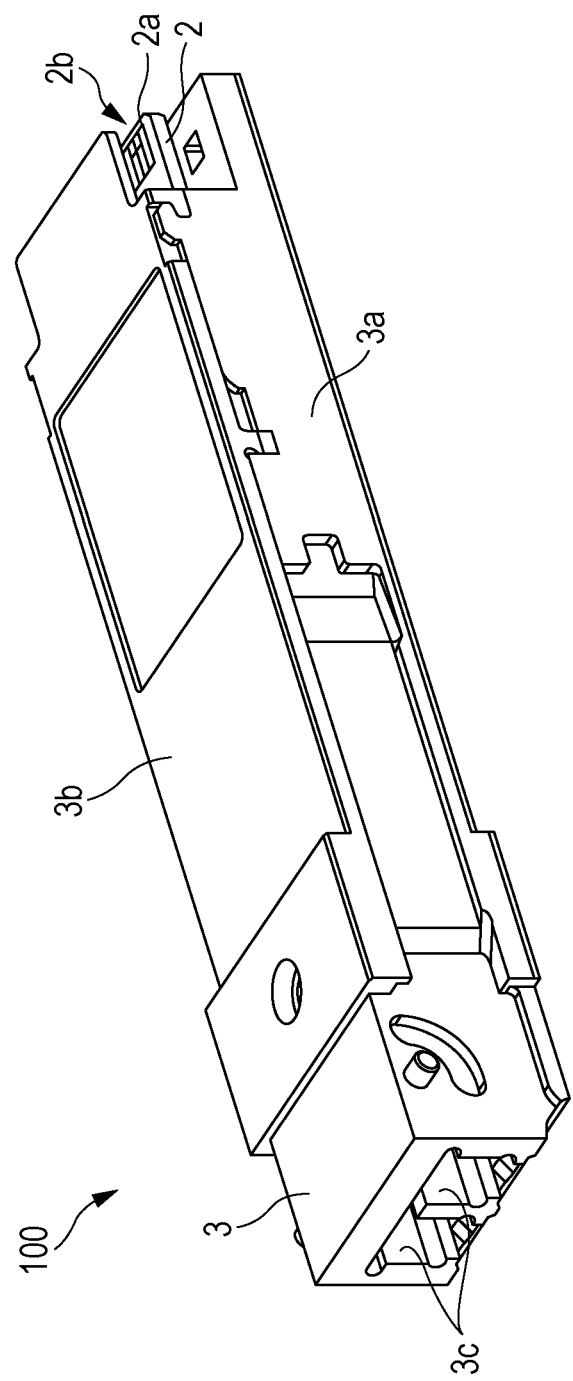
FIG. 1A is a perspective external view of an optical module according to an embodiment of the present invention.
Figure 1B:
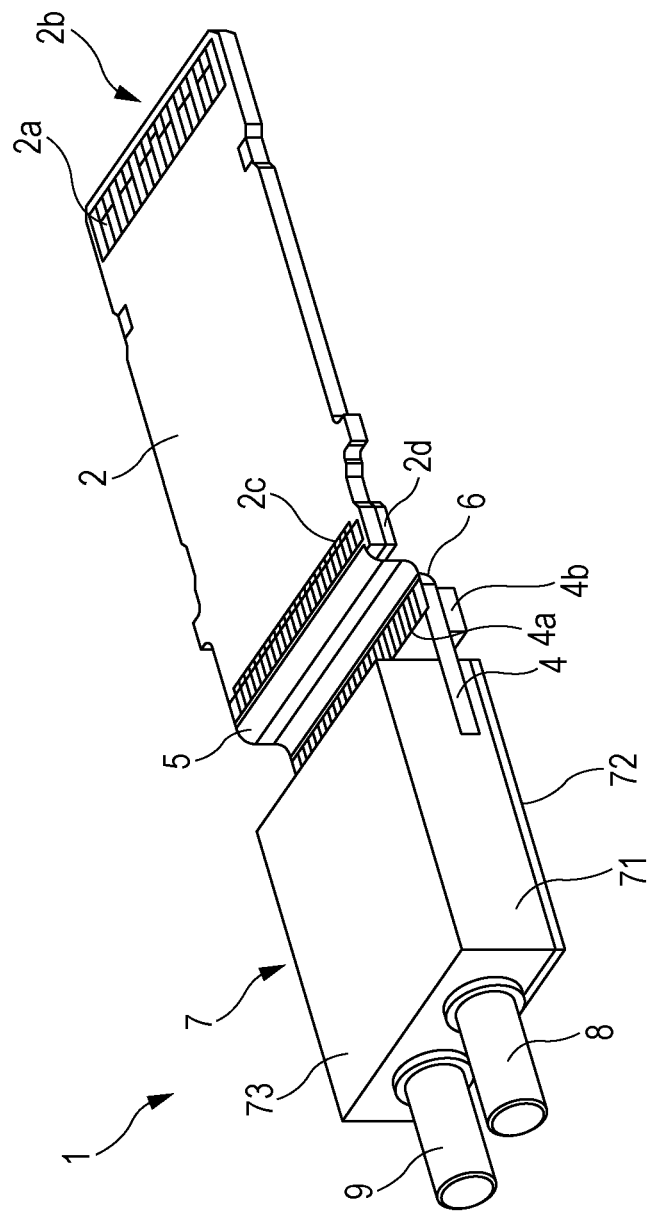
FIG. 1B is a perspective view of the optical module according to the embodiment of the present invention with a module casing omitted.

FIG. 1A is a perspective external view of an optical module according to an embodiment of the present invention. FIG. 1B is a perspective view of the optical module according to the embodiment of the present invention with a casing of the optical module omitted.

As illustrated in FIGS. 1A and 1B, an optical module 100 includes a transmitter and receiver integrated optical sub-assembly 1 according to the present embodiment, a first circuit board 2, and a casing 3 that houses the transmitter and receiver integrated optical sub-assembly 1 and the first circuit board 2.

The casing 3 includes a main body 3a that houses the transmitter and receiver integrated optical sub-assembly 1 and the first circuit board 2. The casing 3 also includes a lid 3b that closes an opening (not illustrated) of the main body 3a. Two insertion holes 3c are formed at a distal end portion (end portion on the left front side of FIG. 1A) of the main body 3a. Optical plugs (not illustrated) provided at end portions of transmission and reception optical fibers are inserted into the insertion holes 3c. Furthermore, an opening is formed at a proximal end portion (end portion on the right rear side of FIG. 1A) of the main body 3a. An end portion of the first circuit board 2 is exposed from this opening.

Electrodes 2a for connection to a communication device (not illustrated) are arranged at the end portion of the first circuit board 2 (end portion on an opposite side to the transmitter and receiver integrated optical sub-assembly 1) exposed from the main body 3a. Thus, a card edge connector 2b is formed. The optical module 100 converts electrical signals received from the communication device through the card edge connector 2b into optical signals and transmits the resulting optical signals to the transmission optical fiber. Also, the optical module 100 converts the optical signals received from the reception optical fiber into electrical signals and outputs the resulting electrical signals to the communication device through the card edge connector 2b.

Although it is not illustrated, the first circuit board 2 includes a clock data recovery (CDR) circuit, a power supply circuit, a microcontroller, and so forth. The CDR shapes waveforms of the electrical signals output from the transmitter and receiver integrated optical sub-assembly 1, and the microcontroller controls the entirety of the optical module 100 including the transmitter and receiver integrated optical sub-assembly 1.

According to the present embodiment, the first circuit board 2 and a second circuit board 4, which is included in the transmitter and receiver integrated optical sub-assembly 1, are connected to each other through two flexible printed circuits (FPCs) 5 and 6.

At an end portion of the first circuit board 2 on the transmitter and receiver integrated optical sub-assembly 1 side, a plurality of electrodes 2c are arranged in the width direction on one surface (top surface of FIG. 1B) of the first circuit board 2 and an FPC connector 2d is provided on another surface (bottom surface of FIG. 1B) of the first circuit board 2.

Meanwhile, at another end portion of the second circuit board 4, a plurality of electrodes 4a are arranged in the width direction on one surface (top surface of FIG. 1B) of the second circuit board 4 and an FPC connector 4b is provided on another surface (bottom surface of FIG. 1B) of the second circuit board 4.

The electrodes 2c and the corresponding electrodes 4a are electrically connected to one another by soldering one end of the first FPC 5 to the electrodes 2c of the first circuit board 2 and soldering another end of the first FPC 5 to the electrodes 4a of the second circuit board 4. In addition, the connector portions (not illustrated) provided at both ends of the second FPC 6 are connected to the FPC connectors 2d and 4b. Thus, the first circuit board 2 and the second circuit board 4 are electrically connected each other.

It should be understood that the structure that connects the first circuit board 2 and the second circuit board 4 to each other is not limited to this. For example, the FPC connectors 2d and 4b may be omitted and the second FPC 6 may be soldered to both the boards 2 and 4 instead. Furthermore, a single FPC or three or more FPCs may be used to connect both the board 2 and 4 to each other.

The optical module 100 multiplexes, for example, four optical signals of different wavelengths each transmitted at an information transmission speed of 25 Gb/s into one signal so as to transmit the signal and receives and demultiplexes such a multiplexed signal, thereby supporting a transmission speed of 100 Gb/s.

Next, the transmitter and receiver integrated optical sub-assembly 1 is described.

Figure 2A:
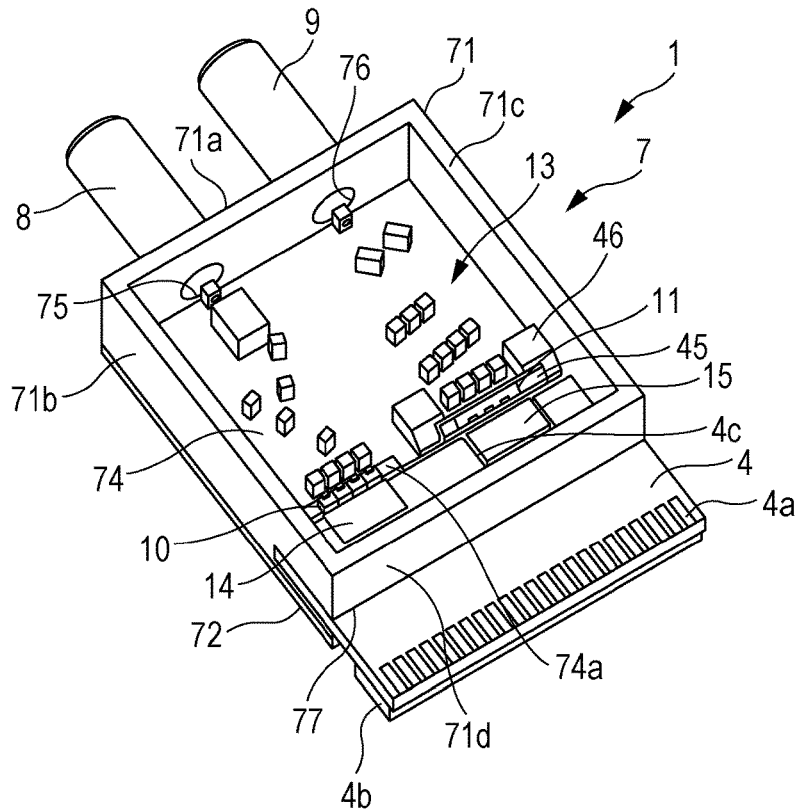
FIGS. 2A and 2B illustrate a transmitter and receiver integrated optical sub-assembly according to the embodiment of the present invention, and, out of FIGS. 2A and 2B.
Figure 2B:
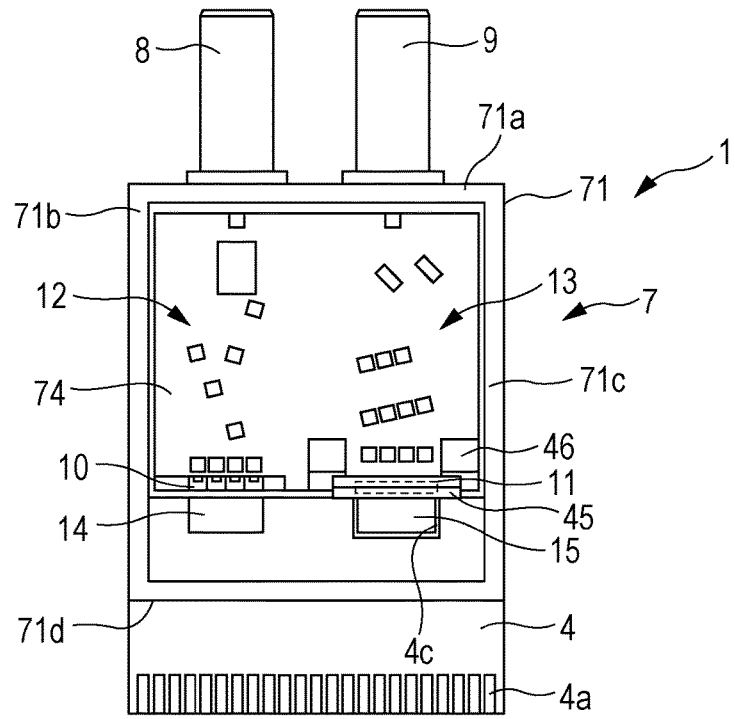

FIGS. 2A and 2B illustrate the transmitter and receiver integrated optical sub-assembly 1, and out of FIGS. 2A and 2B, FIG. 2A is a perspective view of the transmitter and receiver integrated optical sub-assembly 1, and FIG. 2B is a plan view of the transmitter and receiver integrated optical sub-assembly 1.

As illustrated in FIGS. 2A and 2B, the transmitter and receiver integrated optical sub-assembly 1 includes a housing 7, a transmitter-side optical receptacle 8, a receiver-side optical receptacle 9, the second circuit board 4, a plurality of laser diodes (LDs) 10, a plurality of photo diodes (PDs) 11, a transmitter-side optical system 12, a receiver-side optical system 13, a driver integrated circuit (IC) 14, and a transimpedance amplifier (TIA) 15. The LDs 10 serve as light emitting elements, the PDs 11 serve as light receiving elements, and the TIA 15 serves as an amplifying integrated circuit (IC).

The housing 7 includes a box-shaped side wall structure 71 having openings at its top and bottom in a height direction, a bottom wall 72 that closes the opening at the bottom of the side wall structure 71, and a top wall 73 (see FIG. 1B) that closes the opening at the top of the side wall structure 71. The top wall 73 is omitted from FIGS. 2A and 2B. Hereafter, an up-down direction of FIG. 2B (direction perpendicular to the height direction) is referred to as a length direction, and a left-right direction of FIG. 2B (direction perpendicular to the height direction and the length direction) is referred to as a width direction.

According to the present embodiment, the housing 7 has a rectangular parallelepiped shape. The side wall structure 71 having a rectangular shape in top view includes a first side wall 71a disposed in the width direction, a second side wall 71b and a third side wall 71c that extend in the length direction from respective end portions of the first side wall 71a in the width direction, and a fourth side wall 71d that is disposed in the width direction and connects an opposite end portion of the second side wall 71b to the first side wall 71a to an opposite end portion of the third side wall 71c to the first side wall 71a.

The housing 7 is preferably formed of a material having a high thermal conductivity from the view point of improvement of a heat dissipation capability. Although the housing 7 is formed of metal, and more specifically, a gold-plated Kovar (trademark) material according to the present embodiment, the housing 7 may be formed of resin. The side wall structure 71 is hermetically connected to the bottom wall 72 and the top wall 73 by, for example, welding or bonding.

Two through holes 75 and 76 are formed on the one side of the side wall structure 71 in the length direction, that is, in the first side wall 71a. The through holes 75 and 76 are spaced from each other in the width direction and penetrate through the first side wall 71a. The transmitter-side optical receptacle 8 is attached to the through hole 75, which is one of the two through holes 75 and 76, and the receiver-side optical receptacle 9 is attached to another through hole 76. The optical plug for transmission, which is inserted through one of the insertion holes 3c of the casing 3, is connected to the transmitter-side optical receptacle 8. The optical plug for reception, which is inserted through the other insertion hole 3c of the casing 3, is connected to the receiver-side optical receptacle 9.

A through hole for a board 77 is formed on the other side of the side wall structure 71 in the length direction, that is, in the fourth side wall 71d. The second circuit board 4 is inserted through the through hole for a board 77. Here, parts of the through hole for a board 77 extend from the fourth side wall 71d to the second and third side walls 71b and 71c.

The one end portion of the second circuit board 4 is inserted into the housing 7 through the through hole for a board 77, and the other end portion of the second circuit board 4 is disposed outside the housing 7. The second circuit board 4 is secured to the housing 7 by brazing using, for example, a silver solder. The width of the second circuit board 4 is substantially the same as that of the housing 7. Both end portions of the second circuit board 4 in the width direction are supported by the second and third side walls 71b and 71c.

The second circuit board 4 includes, for example, a ceramic multilayer board. The plurality of electrodes 4a arranged in the width direction at the other end portion of the second circuit board 4 are electrically connected to the driver IC 14 and the TIA 15 through a wiring pattern (not illustrated) formed on the second circuit board 4 and FPC connector 4b is electrically connected to the driver IC 14 and the TIA 15 through the wiring pattern formed on the second circuit board 4. When forming the wiring pattern on a front surface or a rear surface of the second circuit board 4, an insulating body such as ceramic may be interposed between the second circuit board 4 and the housing 7 so that the wiring pattern and the housing 7 are not in contact with each other.

According to the present embodiment, a metal plate 74 secured to the bottom wall 72 is further provided. The plurality of LDs 10, the plurality of PDs 11, the transmitter-side optical system 12, and the receiver-side optical system 13 are mounted on the metal plate 74. The metal plate 74 is used to align the position of the transmitter-side optical system 12 with the position of the transmitter-side optical receptacle 8 in the height direction and the position of the receiver-side optical system 13 with the position of receiver-side optical receptacle 9 in the height direction. The metal plate 74 is also used to improve the heat dissipation capability. The metal plate 74 is preferably formed of a material that has a coefficient of linear expansion substantially equal to those of semiconductors included in the LDs 10 and PDs 11 and members such as glass included in the transmitter-side optical system 12 and the receiver-side optical system 13. For example, it is preferable that the metal plate 74 be formed of a Kovar material. It is also possible that the metal plate 74 is omitted and the thickness of the bottom wall 72 is increased instead. The metal plate 74 is secured to the bottom wall 72 by using, for example, a tin silver solder.

The plurality of LDs 10 are directly mounted on the metal plate 74, which is secured to the bottom wall 72, and arranged in a row in the width direction. Here, a case where four LDs 10 are provided is described. The light emission wavelengths of the four LDs 10 are different from one another. The driver IC 14 that drives the LDs 10 is disposed between the four LDs 10 and the fourth side wall 71d.

Figure 3A:
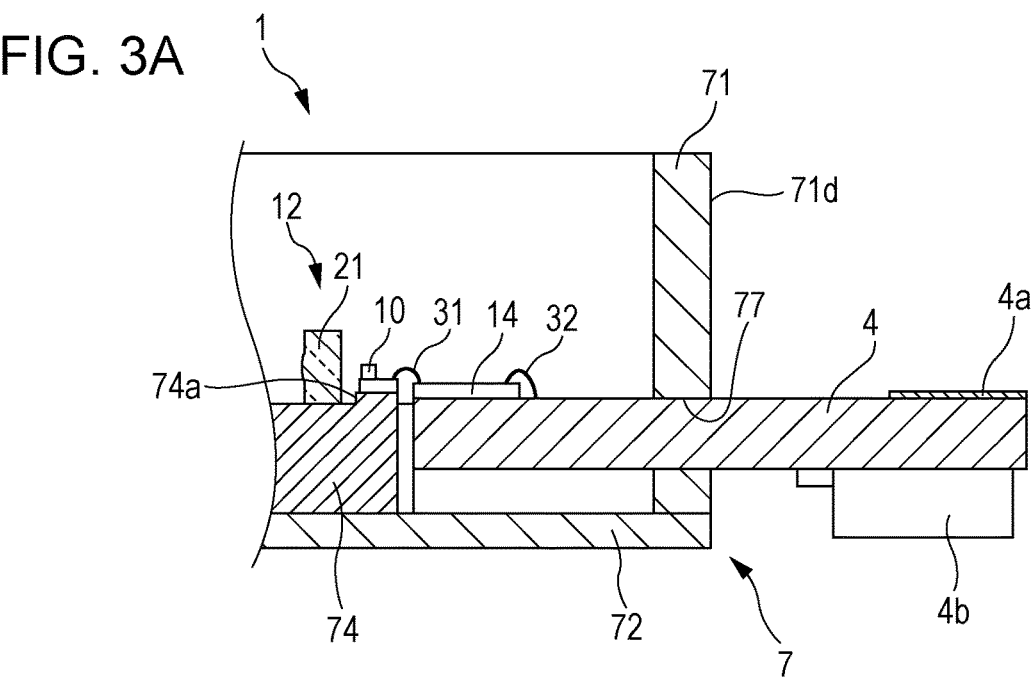
FIG. 3A is an enlarged sectional view of a main portion of the transmitter and receiver integrated optical sub-assembly of FIGS. 2A and 2B.

As illustrated in FIG. 3A, the LDs 10 are mounted on the metal plate 74 and the driver IC 14 is mounted on the circuit board 4 inserted into the housing 7 according to the present embodiment. With this structure, heat generated in the driver IC 14 is unlikely to be transmitted to the LDs 10. This can suppress the occurrences of problems such as reduction in luminous efficiency of the LDs 10 due to transmission of the heat generated in the driver IC 14 to the LDs 10.

The LDs 10 and the driver IC 14 are electrically connected to one another through wiring 31. The driver IC 14 and the wiring pattern of the second circuit board 4 are electrically connected to each other through wiring 32. Here, a projection 74a that projects upward is formed at an end portion of the metal plate 74 on the second circuit board 4 side. The LDs 10 are mounted on this projection 74a so that the optical axes of the LDs 10 are coincident with the respective optical axes of collimating lenses 21 of the transmitter-side optical system 12.

From the viewpoint of reducing the likelihood of the heat generated in the driver IC 14 being transmitted to the LDs 10, the metal plate 74 and the second circuit board 4 are preferably separated from each other so as to thermally insulate the metal plate 74 and the second circuit board 4 from each other. Furthermore, when ground wiring is routed to the end portion of the second circuit board 4, the ground wiring and the metal plate 74 are electrically connected to each other through contact between the second circuit board 4 and the metal plate 74. In this case, the metal plate 74 and the second circuit board 4 are preferably separated from each other from the viewpoint of separation of a signal ground and a case ground. However, when the distance between the metal plate 74 and the second circuit board 4 is excessively increased, the length of the wiring (wiring 31) between the driver IC 14 and the LDs 10 is increased. This causes degradation of the high-speed signals. Thus, from the viewpoint of suppressing the degradation of the high-speed signals, it can be said that the metal plate 74 and the second circuit board 4 are preferably disposed close to each other as much as possible. With the above-described viewpoints taken into consideration, according to the present embodiment, the metal plate 74 and the second circuit board 4 are separated from each other by a distance of about 0.1 to 0.2 mm.

The transmitter-side optical system 12 is disposed between the transmitter-side optical receptacle 8 and four LDs 10 on the bottom wall 72 (here, on the metal plate 74) and combines optical signals incident thereupon from four LDs 10 so as to output a resulting optical signal to the transmitter-side optical receptacle 8.

Figure 3B:
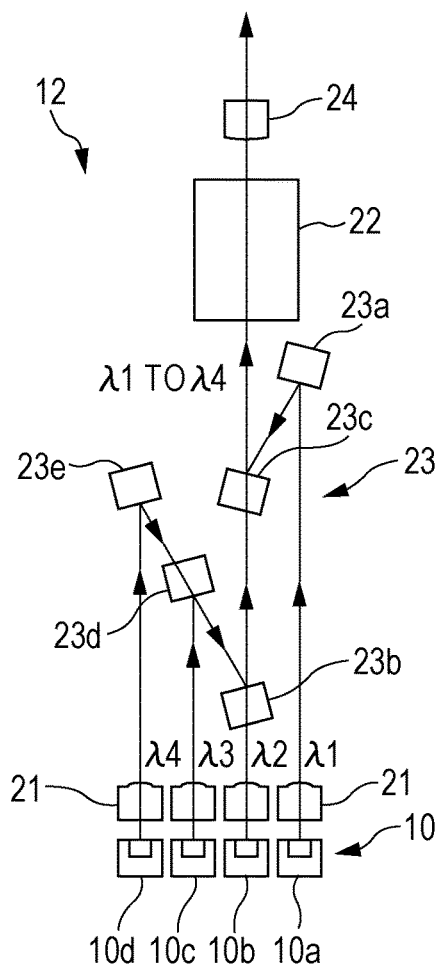
FIG. 3B illustrates the structure of a transmitter-side optical system.

As illustrated in FIG. 3B, the transmitter-side optical system 12 includes four collimating lenses 21, an optical isolator 22, five mirrors (filters) 23, and an output-side lens 24. The collimating lenses 21 collimate light incident thereupon from the LDs 10. The mirrors convert the optical paths of beams of the light having been output from the LDs 10 and passed through the collimating lenses 21 so as to guide the light to the optical isolator 22. The output-side lens 24 condenses the light having passed through the optical isolator 22 so as to output the light to the transmitter-side optical receptacle 8. The optical isolator 22 transmits only light traveling in a forward direction and blocks light traveling in the opposite direction. Here, the optical isolator 22 transmits only the light traveling from the LD 10 side to the transmitter-side optical receptacle 8 side.

Four collimating lenses 21 are each disposed at a position facing a light emitting portion of a corresponding one of the LDs 10. The distance between each of the collimating lenses 21 and a corresponding one of the LDs 10 is equal to the focal length of the collimating lens 21. Hereafter, it is assumed that first to fourth LDs 10a to 10d are arranged from the right to left of FIG. 3B and the light emission wavelengths of the first to fourth LDs 10a to 10d are respectively $\lambda 1$ to $\lambda 4$.

The five mirrors 23 include the following first to fifth mirrors 23a to 23e: the first mirror 23a that reflects a beam of the light having a wavelength of $\lambda 1$; the second mirror 23b that transmits a beam of the light having a wavelength of $\lambda 2$ and reflects beams of the light having wavelengths of $\lambda 3$ and $\lambda 4$; the third mirror 23c that transmits the beams having wavelengths of $\lambda 2$, $\lambda 3$, and $\lambda 4$ and reflects the beam having wavelength of $\lambda 1$; the fourth mirror 23d that transmits the beam having a wavelength of $\lambda 4$ and reflects the beam having a wavelength of $\lambda 3$; and the fifth mirror 23e that reflects the beam having a wavelength of 4.

The first mirror 23a reflects the beam having a wavelength of $\lambda 1$ having been output from the first LD 10a and passed through a corresponding one of the collimating lenses 21 so as to guide the beam having a wavelength of $\lambda 1$ to the third mirror 23c. The second mirror 23b reflects the beam having a wavelength of $\lambda 3$ incident thereupon from the fourth mirror 23d and the beam having a wavelength of $\lambda 4$ incident thereupon from the fifth mirror 23e so as to guide the beam having a wavelength of $\lambda 3$ and the beam having a wavelength of $\lambda 4$ to the optical isolator 22. The third mirror 23c reflects the beam having a wavelength of $\lambda 1$ incident thereupon from the first mirror 23a so as to guide the beam having a wavelength of $\lambda 1$ to the optical isolator 22. The fourth mirror 23d reflects the beam having a wavelength of $\lambda 3$ having been output from the third LD 10c and passed through a corresponding one of the collimating lenses 21 so as to guide the beam having a wavelength of $\lambda 3$ to the second mirror 23b. The fifth mirror 23e reflects the beam having a wavelength of $\lambda 4$ having been output from the fourth LD 10d and passed through a corresponding one of the collimating lenses 21 so as to guide the beam having a wavelength of $\lambda 4$ to the second mirror 23b.

The beam having a wavelength of $\lambda 1$ output from the first LD 10a passes through a corresponding one of the collimating lenses 21, is sequentially reflected by the first mirror 23a and the third mirror 23c, passes through the optical isolator 22, and then is condensed by the output-side lens 24 in the transmitter-side optical system 12 so as to be output to the transmitter-side optical receptacle 8. The beam having a wavelength of $\lambda 2$ output from the second LD 10b passes through a corresponding one of the collimating lenses 21, is transmitted through the second mirror 23b and the third mirror 23c, passes through the optical isolator 22, and then is condensed by the output-side lens 24 in the transmitter-side optical system 12 so as to be output to the transmitter-side optical receptacle 8. The beam having a wavelength of $\lambda 3$ output from the third LD 10c passes through a corresponding one of the collimating lenses 21, is sequentially reflected by the fourth mirror 23d and the second mirror 23b, is transmitted through the third mirror 23c, passes through the optical isolator 22, and then is condensed by the output-side lens 24 in the transmitter-side optical system 12 so as to be output to the transmitter-side optical receptacle 8. The beam having a wavelength of $\lambda 4$ output from the fourth LD 10d passes through a corresponding one of the collimating lenses 21, is reflected by the fifth mirror 23e, is transmitted through the fourth mirror 23d, is reflected by the second mirror 23b, is transmitted through the third mirror 23c, passes through the optical isolator 22, and then is condensed by the output-side lens 24 in the transmitter-side optical system 12 so as to be output to the transmitter-side optical receptacle 8.

The beams having wavelengths of $\lambda 1$ to $\lambda 4$ output from the LDs 10a to 10d are combined as described above by the transmitter-side optical system 12 so as to be output from the transmitter-side optical receptacle 8. It should be understood that the specific structure of the transmitter-side optical system 12 is not limited to the above description and can be changed as appropriate.

Figure 4A:
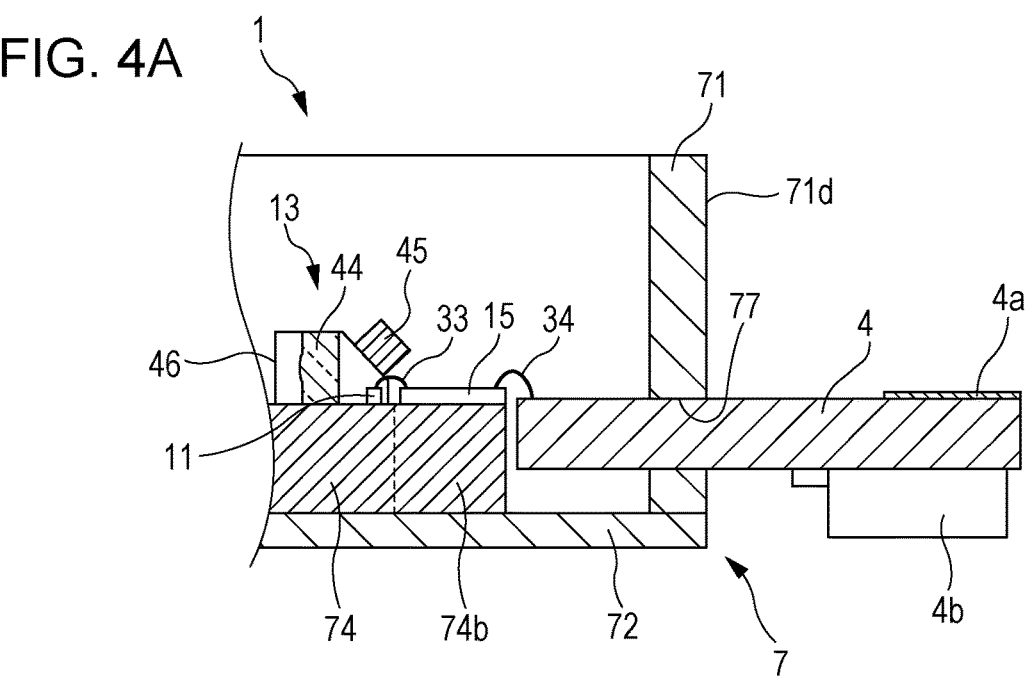
FIG. 4A is an enlarged sectional view of a main portion of the transmitter and receiver integrated optical sub-assembly of FIGS. 2A and 2B.

As illustrated in FIGS. 2A, 2B, and 4A, the plurality of PDs 11 are directly mounted on the metal plate 74, which is secured to the bottom wall 72, and arranged in a row in the width direction. It is noted that the plurality of PDs 11 and the plurality of LDs 10 are not necessarily arranged in a single row. It is sufficient that the plurality of PDs 11 be arranged in a row and the plurality of LDs 10 be arranged in a row. Here, a case where four PDs 11 are provided is described. The TIA 15 that amplifies electrical signals output from the PDs 11 is disposed between four PDs 11 and the fourth side wall 71d. The TIA 15 and the driver IC 14 are arranged such that the positions where the TIA 15 and the driver IC 14 are disposed are substantially the same in the length direction.

According to the present embodiment, the TIA 15 is directly mounted on the metal plate 74. Specifically, a cut 4c is formed at a position of the second circuit board 4 where the TIA 15 is mounted and a projection 74b that projects into the cut 4c is formed in the metal plate 74, and the TIA 15 is mounted on the projection 74b. Thus, the heat dissipation capability is improved by mounting the TIA 15 on the metal plate 74 having a larger heat dissipation area and the degradation of the high-speed signals is suppressed by reducing the distance between the PDs 11 and the TIA 15. When neither the degradation of the heat dissipation capability nor the degradation of the high-speed signals causes a problem, the TIA 15 may be mounted on the second circuit board 4.

The PDs 11 and the TIA 15 are electrically connected to one another through wiring 33. The TIA 15 and the wiring pattern of the second circuit board 4 are electrically connected to each other through wiring 34. Here, the PDs 11 have light receiving portions on their top surfaces.

The receiver-side optical system 13 is disposed between the receiver-side optical receptacle 9 and four PDs 11 on the bottom wall 72 (here, on the metal plate 74) and splits the optical signal incident thereupon from the receiver-side optical receptacle 9 so as to output resulting optical signals to four PDs 11.

Figure 4B:
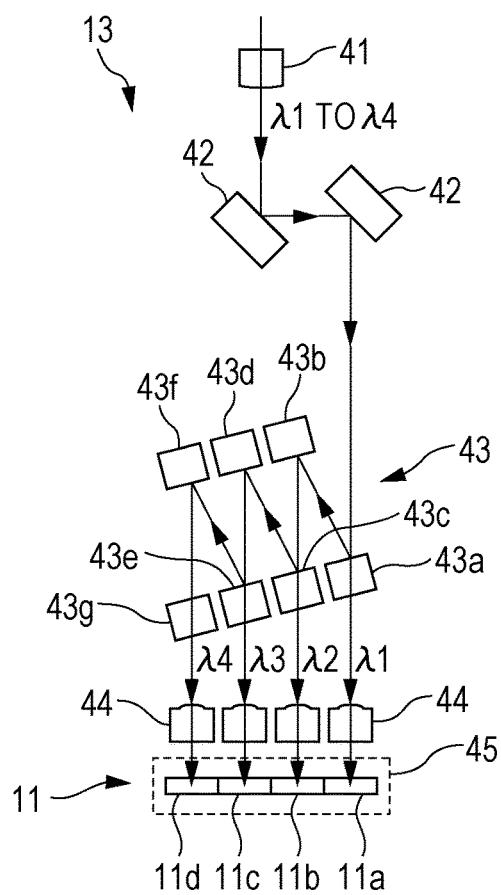
FIG. 4B illustrates the structure of a receiver-side optical system.

As illustrated in FIG. 4B, the receiver-side optical system 13 includes a collimating lens 41, a pair of optical path conversion mirrors 42, an optical splitter 43, four condensing lenses 44, and a light-reception-side mirror 45. The collimating lens 41 collimates light incident thereupon from the receiver-side optical receptacle 9. The optical path conversion mirrors 42 translate the light incident thereupon from the collimating lens 41 in the width direction. The optical splitter 43 includes seven mirrors (filters) 43a to 43g, splits the light incident thereupon from the optical path conversion mirrors 42 into light beams having different wavelengths, and outputs the split beams. The condensing lenses 44 condense the beams having respective wavelengths incident thereupon from the optical splitter 43. The light-reception-side mirror 45 reflects downward in the height direction the beams incident thereupon from the condensing lenses 44 so as to guide the beams to the light receiving portions of the respective PDs 11. The light-reception-side mirror 45 is secured to the metal plate 74 with a support member 46 interposed therebetween.

Hereafter, a case is described in which light including beams having wavelengths of $\lambda 1$ to $\lambda 4$ are incident from the receiver-side optical receptacle 9, and the beams having wavelengths of $\lambda 1$, $\lambda 2$, $\lambda 3$, and $\lambda 4$ are respectively received by a first PD 11a, a second PD 11b, a third PD 11c, and a fourth PD 11d.

The optical splitter 43 includes the following first to seventh mirrors 43a to 43g: the first mirror 43a that transmits the beam having a wavelength of $\lambda 1$ and reflects the beams having wavelengths of $\lambda 2$ to $\lambda 4$ among the beams of light incident thereupon from the optical path conversion mirrors 42; the second mirror 43b that reflects the beams of all the wavelengths incident thereupon from the first mirror 43a; the third mirror 43c that transmits the beam having a wavelength of $\lambda 2$ and reflects the beams having wavelengths of $\lambda 3$ and $\lambda 4$ among the beams incident thereupon from the second mirror 43b; the fourth mirror 43d that reflects the beams of all the wavelengths incident thereupon from the third mirror 43c; the fifth mirror 43e that transmits the beam having a wavelength of $\lambda 3$ and reflects the beams having wavelength of $\lambda 4$ among the beams incident thereupon from the fourth mirror 43d; the sixth mirror 43f that reflects the beams of all the wavelengths incident thereupon from the fifth mirror 43e; and the seventh mirror 43g that transmits the beam having a wavelength of $\lambda 4$ among the beams incident thereupon from the sixth mirror 43f.

The beam having a wavelength of $\lambda 1$ having been transmitted through the first mirror 43a is condensed by a corresponding one of the condensing lenses 44, reflected by the light-reception-side mirror 45, and then received by the first PD 11a. The beam having a wavelength of $\lambda 2$ having been transmitted through the third mirror 43c is condensed by a corresponding one of the condensing lenses 44, reflected by the light-reception-side mirror 45, and then received by the second PD 11b. The beam having a wavelength of $\lambda 3$ having been transmitted through the fifth mirror 43e is condensed by a corresponding one of the condensing lenses 44, reflected by the light-reception-side mirror 45, and then received by the third PD 11c. The beam having a wavelength of $\lambda 4$ having been transmitted through the seventh mirror 43g is condensed by a corresponding one of the condensing lenses 44, reflected by the light-reception-side mirror 45, and then received by the fourth PD 11d.

As described above, with the receiver-side optical system 13, the light incident upon the receiver-side optical system 13 from the receiver-side optical receptacle 9 is split, and the split beams of wavelengths $\lambda 1$ to $\lambda 4$ are respectively incident upon the PDs 11a to 11d. The specific structure of the receiver-side optical system 13 is not limited to the above description and can be changed as appropriate.

Operations and Effects of the Embodiment

As has been described, the LDs 10, the PDs 11, the transmitter-side optical system 12, the receiver-side optical system 13, the driver IC 14, and the TIA 15 are disposed in the housing 7 of the transmitter and receiver integrated optical sub-assembly 1 according to the present embodiment. That is, according to the present embodiment, a transmission unit and a reception unit are housed in a single common housing 7.

Thus, compared to a case such as a related-art case where the TOSA serving as the transmission unit and the ROSA serving as the reception unit include their respective housings, the size of the transmitter and receiver integrated optical sub-assembly 1 can be reduced. Since the thickness of the housing 7 is, for example, about 0.8 mm, the width can be reduced at least by about 1.6 mm according to the present embodiment compared to the related art. This can significantly reduce the area occupied by the transmitter and receiver integrated optical sub-assembly 1 in the casing 3. The width of an inner space of the casing 3 is, for example, about 16 mm at the maximum. Accordingly, when the width of the transmitter and receiver integrated optical sub-assembly 1 can be reduced by 1 mm or more, this produces a significant effect.

Furthermore, in the transmitter and receiver integrated optical sub-assembly 1, the driver IC 14 and the TIA 15 are housed in the housing 7. Thus, the driver IC 14 can be disposed in close proximity to the LDs 10 and the TIA 15 can be disposed in close proximity to the PDs 11. As a result, the length of wiring between the LDs 10 and the driver IC 14 and the length of wiring between the PDs 11 and the TIA 15 can be reduced so as to suppress the degradation of the high-speed signals. Thus, the transmitter and receiver integrated optical sub-assembly 1 suitable for high-speed transmission can be realized.

Furthermore, since both the transmission unit and the reception unit are housed in a single common housing 7, the area of the housing 7 is increased compared to the related-art structure in which the TOSA and the ROSA include their respective housings. Thus, the heat dissipation area can be increased, and accordingly, the heat dissipation capability can be improved.

Furthermore, in the case where the TOSA and the ROSA are separately provided as in the related art, the TOSA and the ROSA are provided with their respective circuit boards. This leads to formation of a gap between both the circuit boards which may become a dead space. In contrast, the driver IC 14 and the TIA 15 are connected to a common circuit board, that is, the second circuit board 4 in the transmitter and receiver integrated optical sub-assembly 1. Thus, the wiring space can be reliably increased compared to that of the related art, and more wiring can be formed. Furthermore, wiring and the like of, for example, the power sources of the driver IC 14 and the TIA 15 can be shared. Thus, the wiring space can be reliably increased.

Furthermore, the LDs 10, the PDs 11, the transmitter-side optical system 12, and the receiver-side optical system 13 are mounted on the metal plate 74 secured to the bottom wall 72 in the transmitter and receiver integrated optical sub-assembly 1.

With this structure, the heat dissipation capability can be improved when the housing 7 is formed of a material having a low heat conductivity such as resin. Furthermore, an assembly process is possible in which the metal plate 74 can be housed in the housing 7 after the LDs 10, the PDs 11, the transmitter-side optical system 12, and the receiver-side optical system 13 have been mounted on the metal plate 74. Thus, the assembly process can be facilitated compared to the case where the LDs 10, the PDs 11, the transmitter-side optical system 12, and the receiver-side optical system 13 are directly mounted in the housing 7. Furthermore, relative height positions of the transmitter-side optical system 12 and the transmitter-side optical receptacle 8 and the relative height positions of the receiver-side optical system 13 and the receiver-side optical receptacle 9 can be adjusted by changing the thickness of the metal plate 74.

Furthermore, the driver IC 14 is mounted on the second circuit board 4 and the LDs 10 are mounted on the bottom wall 72 (metal plate 74) in the transmitter and receiver integrated optical sub-assembly 1. Thus, transmission of heat generated in the driver IC 14 to the LDs 10 is suppressed. This can suppress the occurrences of problems such as reduction in luminous efficiency of the LDs 10 due to the effect of heat generated in the driver IC 14.

Summarization of the Embodiment

Next, a technical concept that is understood from the above-described embodiment is described with reference signs and the like used in the embodiment. In should be noted that the reference signs and the like in the following description do not limit elements of the claims to the members or the like specifically described in the embodiment.

[1] A transmitter and receiver integrated optical sub-assembly (1) includes a housing (7), a transmitter-side optical receptacle (8), a receiver-side optical receptacle (9), a circuit board (4), a plurality of light emitting elements (10), a plurality of light receiving elements (11), a transmitter-side optical system (12), a receiver-side optical system (13), a driver integrated circuit (14), and an amplifying integrated circuit (15). The housing (7) includes a box-shaped side wall structure (71) having openings at its top and bottom in a height direction and a bottom wall (72) closing one of the openings at the bottom of the side wall structure (71). The transmitter-side optical receptacle (8) and the receiver-side optical receptacle (9) are respectively attached to one and another of two through holes (75, 76) formed on one side of the side wall structure (71) in a length direction which is perpendicular to the height direction. The circuit board (4) has one end portion inserted into the housing (7) through a through hole for a board (77) formed on another side of the side wall structure (71) in the length direction and another end portion disposed outside the housing (7). The plurality of light emitting elements (10) is disposed on the bottom wall (72) so as to be arranged in a row in a width direction which is perpendicular to the height direction and perpendicular to the length direction, and the plurality of light receiving elements (11) is disposed on the bottom wall (72) so as to be arranged in a row in the width direction. The transmitter-side optical system (12) is disposed in a region of the bottom wall (72) between the transmitter-side optical receptacle (8) and the plurality of light emitting elements (10) and combines optical signals incident thereupon from the plurality of light emitting elements (10) into a signal so as to output the combined signal to the transmitter-side optical receptacle (8). The receiver-side optical system (13) is disposed in a region of the bottom wall (72) between the receiver-side optical receptacle (9) and the plurality of light receiving elements (11) and splits an optical signal incident thereupon from the receiver-side optical receptacle (9) into signals so as to output the split signals to the plurality of light receiving elements (11). The driver integrated circuit (14) is disposed between the plurality of light emitting elements (10) and the other side of the side wall structure (71) in the length direction and drives the plurality of light emitting elements (10). The amplifying integrated circuit (15) is disposed between the plurality of light receiving elements (11) and the other side of the side wall structure (71) in the length direction and amplifies electric signals from the plurality of light receiving elements (11). In the transmitter and receiver integrated optical sub-assembly, the circuit board (4) includes a plurality of electrodes (4a) arranged in the width direction at the other end portion of the circuit board. In the transmitter and receiver integrated optical sub-assembly, the plurality of electrodes (4a) are electrically connected to the driver integrated circuit (14) and the amplifying integrated circuit (15) through a wiring pattern formed on the circuit board.

[2] In the transmitter and receiver integrated optical sub-assembly (1) described in [1], the plurality of light emitting elements (10), the plurality of light receiving elements (11), the transmitter-side optical system (12), and the receiver-side optical system (13) are mounted on a metal plate (74) secured to the bottom wall (72).

[3] In the transmitter and receiver integrated optical sub-assembly (1) described in [2], the amplifying integrated circuit (15) is mounted on the metal plate (74).

[4] In the transmitter and receiver integrated optical sub-assembly (1) described in [2] or [3], the driver integrated circuit (14) is mounted on the circuit board (4).

[5] In the transmitter and receiver integrated optical sub-assembly (1) described in [4], the circuit board (4) and the metal plate (74) are separated from each other.

[6] An optical module (100) includes the transmitter and receiver integrated optical sub-assembly (1) described in any one of [1] to [5] and a casing (3) that houses the transmitter and receiver integrated optical sub-assembly (1).

Although the embodiment of the present invention has been described, the above-described embodiment does not limit the invention which falls within the scope of the claims. Furthermore, it should be noted that not all of the combinations of the features described in the embodiment are necessarily required for means for solving the task of the invention.

The present invention can be modified as appropriate without departing from the gist of the present invention.

For example, although the housing 7 has a rectangular parallelepiped shape according to the above-described embodiment, this does not limit the shape of the housing 7. The housing 7 may have, for example, a polygonal or circular shape in top view.

Although it is not described in the above-described embodiment, a metal plate as a shield may be disposed between the transmission unit (the driver IC 14, the LDs 10, and the transmitter-side optical system 12) and the reception unit (the TIA 15, the PDs 11, and the receiver-side optical system 13) so as to suppress crosstalk between the transmission unit and the reception unit. The crosstalk between the transmission unit and the reception unit is likely to occur between the wiring connecting the driver IC 14 to the LDs 10 and the wiring connecting the TIA 15 to the PDs 11. Thus, by disposing the metal plate at least between the former wiring and the latter wiring, the crosstalk between the transmission unit and the reception unit can be suppressed.

What is claimed is:

1. A transmitter and receiver integrated optical sub-assembly comprising:
    a housing that includes
        a box-shaped side wall structure having openings at its top and bottom in a height direction, and
        a bottom wall closing one of the openings at the bottom of the side wall structure;
    a transmitter-side optical receptacle and a receiver-side optical receptacle that are respectively attached to one and another of two through holes formed on one side of the side wall structure in a length direction which is perpendicular to the height direction;
    a circuit board that has one end portion inserted into the housing through a through hole for a board formed on another side of the side wall structure in the length direction and that has another end portion disposed outside the housing;
    a plurality of light emitting elements disposed on the bottom wall so as to be arranged in a row in a width direction which is perpendicular to the height direction and perpendicular to the length direction and a plurality of light receiving elements disposed on the bottom wall so as to be arranged in a row in the width direction;
    a transmitter-side optical system that is disposed in a region of the bottom wall between the transmitter-side optical receptacle and the plurality of light emitting elements and that combines optical signals incident thereupon from the plurality of light emitting elements into a signal so as to output the combined signal to the transmitter-side optical receptacle;
    a receiver-side optical system that is disposed in a region of the bottom wall between the receiver-side optical receptacle and the plurality of light receiving elements and that splits an optical signal incident thereupon from the receiver-side optical receptacle into signals so as to output the split signals to the plurality of light receiving elements;
    a driver integrated circuit that is disposed between the plurality of light emitting elements and the other side of the side wall structure in the length direction and that drives the plurality of light emitting elements; and
    an amplifying integrated circuit that is disposed between the plurality of light receiving elements and the other side of the side wall structure in the length direction and that amplifies electric signals from the plurality of light receiving elements,
    wherein the circuit board includes a plurality of electrodes arranged in the width direction at the other end portion of the circuit board, and
    wherein the plurality of electrodes are electrically connected to the driver integrated circuit and the amplifying integrated circuit through a wiring pattern formed on the circuit board.

2. The transmitter and receiver integrated optical sub-assembly according to claim 1,
    wherein the plurality of light emitting elements, the plurality of light receiving elements, the transmitter-side optical system, and the receiver-side optical system are mounted on a metal plate secured to the bottom wall.

3. The transmitter and receiver integrated optical sub-assembly according to claim 2,
    wherein the amplifying integrated circuit is mounted on the metal plate.

4. The transmitter and receiver integrated optical sub-assembly according to claim 2,
    wherein the driver integrated circuit is mounted on the circuit board.

5. The transmitter and receiver integrated optical sub-assembly according to claim 4,
    wherein the circuit board and the metal plate are separated from each other.

6. An optical module comprising:
    the transmitter and receiver integrated optical sub-assembly according to claim 1; and
    a casing that houses the transmitter and receiver integrated optical sub-assembly.

* * * * *